July 9, 1957 R. W. BAILEY ET AL 2,798,585
SELECTIVE FEEDING MEANS
Filed Nov. 19, 1956 3 Sheets-Sheet 1
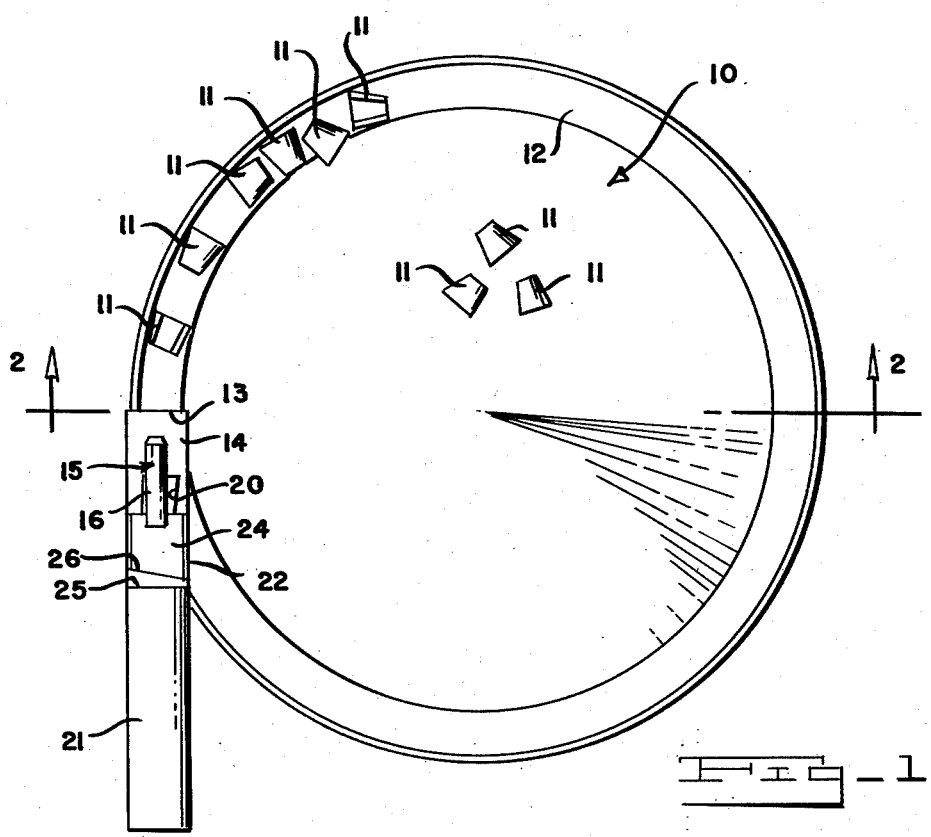
Fig. 1
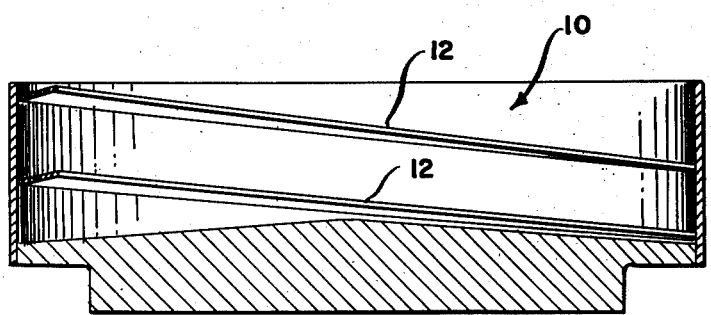
Fig. 2
INVENTOR.
ROY W. BAILEY
BY JOHN T. FAULL
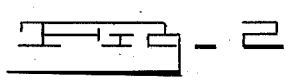
ATTORNEYS July 9, 1957     R. W. BAILEY ET AL     2,798,585
SELECTIVE FEEDING MEANS Filed Nov. 19, 1956     3 Sheets-Sheet 2

INVENTOR.
ROY W. BAILEY
JOHN T. FAULL
BY
Cullen & Canton
ATTORNEYS

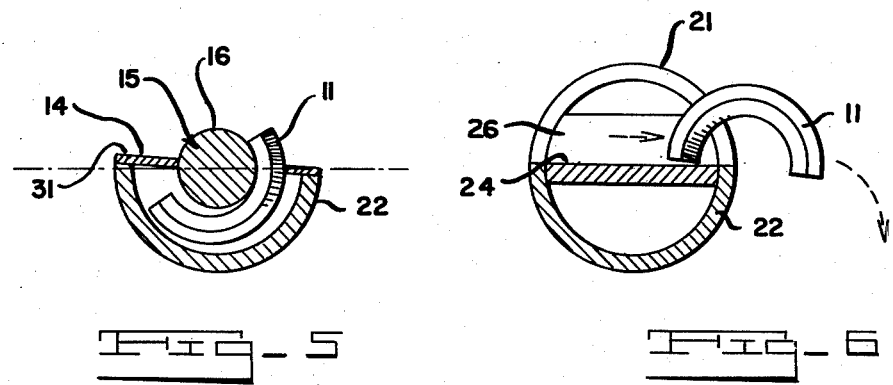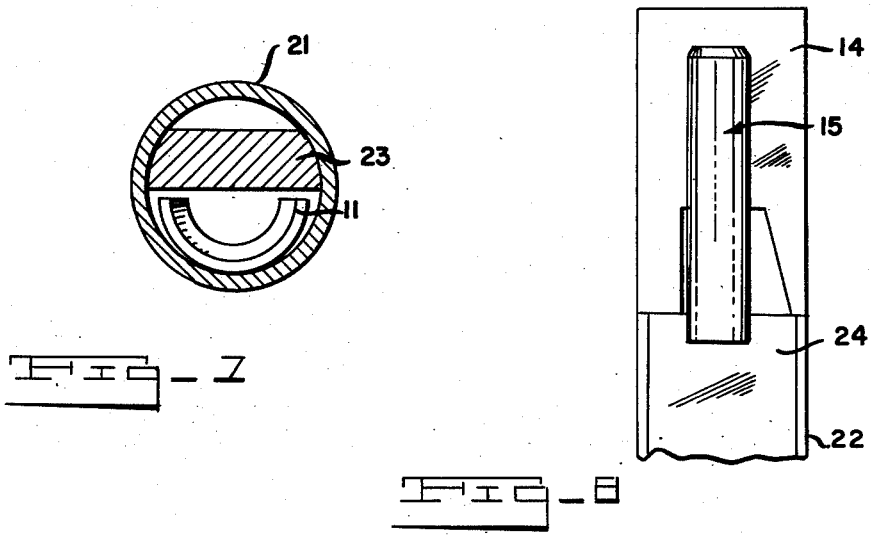

United States Patent Office 2,798,585
Patented July 9, 1957

2,798,585
SELECTIVE FEEDING MEANS

Roy W. Bailey and John T. Faull, Detroit, Mich., assignors to Detroit Power Screwdriver Company, Detroit, Mich.

Application November 19, 1956, Serial No. 622,851

10 Claims. (Cl. 198—33)

This invention relates to a selective feeding means, and more particularly to a means for feeding small parts from a feeder mechanism, such as illustrated in application S. N. 450,444 filed August 17, 1954, with such small parts being oriented in a predetermined direction.

In the above application a mechanism is illustrated which consists of a large drum having spiral tracks formed around the inside walls for feeding small parts or workpieces from the bottom of the drum along the tracks. These parts are then fed from the spiral tracks to a feeder tube or a feeder track from which the parts are then taken to be assembled to other parts. One of the problems involved with such a feeder drum is that of orienting the workpieces or parts into the proper direction so that when they come out of the final feeder tube they are in the proper position to be assembled to the main workpiece assembly.

Thus, it is an object of this invention, to form a mechanism for selectively feeding those workpieces which are properly oriented on the spiral track and for maintaining the orientation of the workpieces until these workpieces reach their final assembly point. The workpieces with which this invention is particularly concerned are those which broadly are formed as one-half of a truncated cone having an axial bore and cut in half. Obviously, the shape of the workpiece may vary considerably, but basically the workpiece has a central opening extending from end to end and open on one side, and a uniform wall thickness in any plane transverse to the axis of the workpiece, but a varying wall thickness in the direction axially of the workpiece.

This and other objects of our invention will become apparent upon reading the following description of which the attached drawings form a part.

With reference to the drawings, in which:

Fig. 1 is a top view of the feeder drum.

Fig. 2 is a view taken in the direction of arrows 2—2 of Fig. 1.

Fig. 3 is an enlarged fragmentary view of that portion of the feeder drum wherein the track is connected with the outside feeder tube and is interrupted by the selector mechanism of this invention.

Fig. 4 is a view taken in the direction of arrows 4—4 of Fig. 3.

Fig. 5 is a view taken in the direction of arrows 5—5 of Fig. 3, and shows a workpiece partially slipping through the selector opening.

Fig. 6 is a view taken in the direction of arrows 6—6 of Fig. 3 and shows a workpiece being rejected.

Fig. 7 is a view taken in the direction of arrows 7—7 of Fig. 3 and shows a workpiece passing through the feeder tube.

Fig. 8 is a view of the selector blade and mandrel, per se, showing a modification of the device of Fig. 3.

With reference to the drawings, the device herein broadly comprises a feeder drum designated generally as 10 which is an enlarged drum into which the workpieces are piled in any way and which drum is vibrated by a vibration mechanism, not shown herein, so that the workpieces 11 move up a spiral track 12 from the bottom of the drum to the top of the drum. This construction is essentially the same or the equivalent of that shown in the aforementioned patent application.

The track 12 ends at 13 and at this point the selector mechanism of this invention is inserted.

This selector mechanism consists first, of a selector blade 14 which is a flat plate arranged as a continuation of the track as illustrated in Figs. 3 and 4. Centered on the selector blade is a mandrel 15 having an upper surface 16 above the level of the top surfaces of the track and the selector blade. The mandrel is in substantial alignment with the selector blade and with the track.

An opening 20 is formed in the selector blade along the side of the mandrel 15 and the opening is shaped to conform with the cross-section of the workpiece in one end to end axial direction of the workpiece. Since the workpiece ends are not of the same dimension, the opening corresponds to the workpiece shape only when the workpiece is properly oriented in end to end direction.

A feeder tube 21, which is a circular in cross-sectional tube, is aligned with the mandrel and is of sufficient internal diameter to receive the workpieces. The top of the feeder tube is cut away at the mandrel end to provide an under portion or extension portion 22 which passes beneath the mandrel and the selector blade. In addition, a filler bar 23 fits within the feeder tube so as to block off the upper part of the tube and this filler bar is provided with a flat extension portion 24 which forms a top surface for the extension of the tube 22 in the vicinity between the mandrel and the portion of the tube which is not cut away, indicated at 25. A shoulder 26 is formed on the filler bar extension 24 near the tube portion 25 for reasons to be set forth below.

In operation, workpieces travel up the feed track 12 because of the vibration of the drum 10. Those workpieces which are not axially in alignment with the track may be knocked off the track by means of bumps (not shown) formed on the track along the way or in the alternative may be knocked off by striking the end 30 of the mandrel 15. Those workpieces which are axially aligned with the mandrel and whose openings open downwardly will move along the selector blade 14 and then ride over the top surface 16 of the mandrel 15.

The opening 20 in the selector blade is arranged to correspond to the cross-sectional wall thickness and wall shape of a workpiece when the workpiece is headed in the right direction axially. Thus, in the drawing of Fig. 3, the small end of the workpiece must be the lead end so that the workpiece when it reaches the opening 20 slides into that opening. This sliding is assisted by arranging the surface of the selector blade 14 at an angle to the horizontal at 31 which is in the general vicinity of the opening 20 so that the workpiece is off-balanced and slides through the slot or opening 20 and inverts itself to land with the opening side up in the tube extension 22. The workpiece then travels down the tube under the influence of gravity, the tube being sloped downwards slightly, and is maintained in its upward orientation by means of the bottom of the filler bar which blocks off the top of the tube and prevents the workpiece from inverting itself again while traveling in the tube.

Those workpieces, which are oriented with the thick or wider end first, will not fall through the opening 20 but will continue sliding along the selector bar and then along the top surface 24 of the filler bar extension until they strike the shoulder 26 and are then guided off the filler bar extension and the top track from which it came to fall back into the drum and then to begin its travel all over again.

In Fig. 4, a workpiece is shown falling off the track. Fig. 6 shows one of the workpieces being guided off the filler bar surface 24 by the shoulder 26.

Obviously, the opening in the selector blade may be reversed so that the large end is forward and the small end backward so that the workpieces are oriented with the large end forward and the small end in the back. This is illustrated by the modification of Fig. 7. In addition, the opening can be arranged to take pieces which are ribbed or otherwise formed on the outsides thereof, so long as the pieces are not fully symmetrical from end to end. Likewise, the mandrel may be provided with a ribbing to accommodate any internal ribbing formed in the opening of the workpiece.

The selector means herein, as can be seen, selects only those workpieces which are properly aligned axially and endwise, and takes these selected pieces and delivers them to an assembly point in the proper oriented position. All those other workpieces which are either not properly aligned axially or endwise are discarded and must begin their trip over again through the selector mechanism.

This invention may be further developed within the scope of the following attached claims. Accordingly, the foregoing description should be read as being merely an operative embodiment of our invention and not in a strictly limiting sense.

Having described an operative embodiment of our invention, we now claim:

1. A device for selectively feeding, in a pre-determined orientation, workpieces of one half of a substantially truncated conical shape having an axially extending opening from end to end, comprising a feed track, upon which the workpieces slide, feeding into a feed tube, and selector means interrupting the flow of workpieces from the track to the tube and passing only those workpieces whose openings are concave facing down and whose narrow end faces in a predetermined direction along the track; said selector means comprising a mandrel axially arranged along the line of workpiece travel between the track and tube and having a surface extending above the level of the track surface so that workpieces whose axes are in alignment with the mandrel and whose openings face downwards ride over the surface, all other workpieces being stopped by the mandrel, and an opening at one side of the mandrel and shaped to correspond to the axial cross-section of the wall of the workpiece in one axial direction thereof, whereby workpieces oriented with the wall cross-section corresponding to the opening shape will slip off the mandrel through the opening and then pass on into the feeder tube, but workpieces oppositely oriented will continue on the mandrel and strike a shoulder positioned near the mandrel end and thereby be guided by such stop off the track.

2. A construction as defined in claim 1 above and wherein a selector blade having a surface aligned with the track surface is arranged between the track and the mandrel, and is arranged around the sides of the mandrel, with said opening being formed in the selector blade; said feed tube extending beneath said opening to catch the workpieces falling through the opening.

3. A construction as defined in claim 2 and said selector blade surface, at least in the vicinity of the opening, being angled downwardly in the direction transverse to the mandrel axis to off-balance the workpieces riding over the mandrel surface into the direction wherein the opening is formed.

4. A constructtion as defined in claim 1 and said feed tube extending beneath the opening to catch the workpieces slipping through the opening.

5. A construction as defined in claim 1 and said feed tube being substantially aligned with the mandrel and having an extension passing beneath the mandrel and under the opening to catch the workpieces slipping through the opening.

6. A construction as defined in claim 5 and wherein a filler bar is arranged within the top part of the tube so that workpieces in the tube slide therethrough with the opening facing upwards and with the filler bar being extended to cover the top of the tube extension up to the mandrel and with the top of the filler bar extension formed as a track upon which those workpieces which ride over the opening may ride, said shoulder being formed on the filler bar extension in the path of the workpieces.

7. A device for selectively feeding, in a predetermined orientation, workpieces of one-half of a substantially truncated conical shape having an axially extending opening from end to end, comprising a feed track, upon which the workpieces may slide, feeding into a feed tube, and selector means interrupting the flow of workpieces from the track to the tube and passing only those workpieces whose openings are concave facing downwards and whose narrow end faces in a predetermined direction along the track; said selector means comprising a mandrel axially arranged along the line of workpiece travel between the track and tube and having a surface extending above the level of the track surface so that workpieces whose axes are in alignment with the mandrel and whose openings face downwards ride over such mandrel surface, all other workpieces being stopped by the mandrel; a selector blade having a surface coplanar with the track surface arranged between the track and the mandrel and around the sides of the mandrel, with an opening formed in the selector blade at one side of the mandrel and shaped to correspond to the axial cross-section of the wall of the workpiece in one axial direction thereof, whereby workpieces oriented with the wall cross-section corresponding to the opening shape will slip off the mandrel through the opening and then pass on into the feeder tube; but workpieces oppositely oriented will continue on the mandrel; said feed tube being substantially axially aligned with the mandrel and having an extension passing beneath the mandrel and the opening to catch the workpieces slipping through the opening; and a shoulder formed at the feed tube end of the mandrel to strike those workpieces passing over the mandrel and opening and to guide those workpieces off the track and away from the mandrel.

8. A construction as defined in claim 7 and wherein a filler bar is arranged within the top part of the tube so that workpieces in the tube slide therethrough with the openings facing upwards, and the filler bar being extended to cover the top of the tube extension up to the mandrel, with the top of the filler bar extension formed as a track upon which those workpieces passing over the mandrel may ride and with the shoulder being formed on the filler bar extension in the path of the workpieces.

9. A construction as defined in claim 7, and said selector blade surface, at least in the vicinity of the opening being angled downwardly in the direction transverse to the mandrel axis to off-balance the workpieces riding over the mandrel surface into the direction wherein the opening is formed and said selector blade surface being so arranged, that the workpiece is in contact with the surface while riding over the mandrel surface.

10. A device for selectively feeding, in a predetermined orientation, workpieces having an axial cavity open at the ends and one side thereof and having a uniform cross-section in any plane normal to its axis and a varying shape in its axial direction which workpieces are unoriented before selection thereof, comprising a workpiece carrying track feeding into a feed tube with selector means positioned in the path between the track and feed tube for selecting workpieces which are oriented in the predetermined manner and for causing all workpieces not properly oriented to fall off the track before entering the feed tube; said selector means comprising a mandrel aligned with and narrower than the track and having a surface extending above the surface of the track so that only those workpieces whose cavities open downwardly will ride over the mandrel surface; an opening formed in the track adjacent the mandrel and conforming with the axial cross-sectional shape of the workpiece in one axial direction, whereby workpieces properly oriented will ride over the mandrel and slip through the opening and roll about their axes under the mandrel and continue into the feeder tube, but non-properly oriented workpieces will pass over the opening and engage a stop formed at the end of the mandrel and be caused to fall off the track.

References Cited in the file of this patent

UNITED STATES PATENTS 2,667,797     Buenger _____ Feb. 2, 1954